3,061,407
TREATMENT OF COLUMBITE AND RELATED MINERALS
Alfred Richard Burkin, Shenfield, Basil Meddings, Upperfields, near Midhurst, and Hugh David Sawyer, Wembley, England, assignors to National Research Development Corporation, London, England, a British corporation
No Drawing. Filed Sept. 2, 1959, Ser. No. 837,595
Claims priority, application Great Britain Sept. 2, 1958
6 Claims. (Cl. 23—18)

This invention concerns the treatment of columbite and related tantalo-columbite minerals containing niobium and/or tantalum and has for its object the provision of a process whereby the niobium and/or tantalum content of such minerals may be converted into a form suitable for obtaining the metal(s) or compounds thereof.

It has been found that leaching of columbite and related tantalo-columbite minerals with aqueous caustic potash (KOH) at temperatures of at least about 100° C. and preferably in the range 150–300° C. decomposes the mineral. The solid residue after such leaching is insoluble if the leaching is carried out in the substantial absence of oxygen, oxidising agents or oxygen carriers, and also, to some extent, when the leaching is carried out at the higher temperatures within the aforesaid range, especially with concentrated caustic potash. On the other hand, soluble niobium and/or tantalum compounds are produced if the leaching is carried out in the presence of oxygen (air), oxidising agents such as nitrates (e.g. zirconyl nitrate, potassium nitrate), peroxides (e.g. hydrogen peroxide) or higher valency metal salts (e.g. ferric salts) or oxygen carriers (e.g. manganese dioxide). Under certain of such conditions, substantially the whole of niobium/tantalum content of the mineral can be detected in the leaching solution or as crystals deposited therefrom.

Decomposition of columbite has been exhibited by leaching in the presence of air with caustic potash solutions of concentrations in the range 1–50% (by weight) and at temperatures within the range 100–300° C., the higher temperatures within this range being, however, required to produce measurable decomposition with solutions of the lower concentrations within this range. To obtain the optimum yield of soluble niobium/tantalum compounds potash solutions having a concentration within the range 20–30% appear at present to be convenient at temperatures in the range 150–300° C. since solutions of this concentration range are economical to produce and are more easily handled and separated from solid residues than more concentrated solutions.

The experiments described below illustrate decomposition of mineral columbite by leaching in accordance with the invention. In these experiments, leaching was carried out in a stainless steel autoclave fitted with an internal stirrer which was operated continuously during heating to the desired holding temperature, during maintenance of such temperature (for two hours except in Experiments Nos. 2, 21, 22, 23, 24 and 25) and during cooling to below 100° C. Except for Experiments Nos. 16, 24 and 25, the gas in the autoclave (air or nitrogen) before heating commenced was brought to a pressure such that at the holding temperature the partial pressure of the gas was the same in each case (1133 lbs./square inch, gauge). In Experiments Nos. 1 to 23 the mineral was ground to a fineness such that it all passed a 325 mesh sieve (particle size −43 microns) and in Experiments Nos. 24 and 25 the mineral was ground to a fineness such that it all passed a 200 mesh sieve (particle size −74 microns). Except for Experiments Nos. 21 to 25, the mineral was a portion of the same batch and contained the equivalent of 74.7% by weight of niobium and tantalum pentoxides in the weight ratio of 9.4:1 approximately. In Experiments Nos. 21 to 23, the mineral contained the equivalent of 75% of the pentoxides in approximately the same ratio. In Experiment No. 24 the mineral contained the equivalent of 72.5% by weight of the pentoxides in the approximate weight ratio of 8.2:1, whilst in Experiment No. 25 the mineral contained approximately 77% by weight of the pentoxides in the approximate weight ratio of 1:4.0.

The autoclave had a volume of about 2 litres and for all experiments the leaching solution used was 1 litre of water to which was added the stated weight of solid KOH.

In all cases, following cooling of the autoclave to below 100° C., the gas pressure within the autoclave was carefully released and the autoclave opened. The contents were then discharged, a little de-ionised water being used to wash out the last traces of the solid residue. The suspension so obtained was filtered and the solid washed on the filter with de-ionised water.

*Experiment 1*

50 gm. columbite was leached at 300° C. with an aqueous solution made up by dissolving 227 gm. KOH in 1 litre of water. Air was introduced into the autoclave and brought to a pressure of 580 lbs./square inch, gauge, before heating was commenced.

17.66 gm. of a reddish-brown solid was obtained and 1270 ml. liquid (including the washing water). 34.54 gm. of niobium and tantalum pentoxides were precipitated from this liquid which therefore contained 93% of the niobium and tantalum content of the columbite originally present in the autoclave.

*Experiment 2*

Experiment No. 1 was repeated with the following differences:

(a) Initial air pressure was 600 lbs./square inch.
(b) Maximum (holding) temperature was 280° C.
(c) The holding temperature was maintained for 1 hour 40 minutes.

15.70 gm. of reddish-brown solid was obtained and 1047 ml. of liquid. The latter was found to contain the equivalent of 35.46 gm. of the mixed pentoxides, i.e. 95% of the niobium and tantalum content of the columbite originally present in the autoclave.

*Experiment 3*

Experiment No. 1 was repeated but with an initial air pressure of 635 lbs./square inch and a holding temperature of 250° C.

17.80 gm. of reddish-brown solid was obtained and 1060 ml. liquid which was found to contain the equivalent of 34.75 gm. of the mixed pentoxides, i.e. 93% of the niobium and tantalum content of the columbite originally present in the autoclave.

*Experiment 4*

Experiment No. 1 was repeated but with an initial air pressure of 700 lbs./square inch and a holding temperature of 200° C.

24.97 gm. of reddish-brown solid was obtained and 1160 ml. of liquid which was found to contain the equivalent of 27.52 gm. of the mixed pentoxides, i.e. 75.7% of the niobium and tantalum content of the columbite originally present in the autoclave.

*Experiment 5*

Experiment No. 1 was repeated but with an initial air pressure of 785 lbs./square inch and a holding temperature of 150° C.

39.34 gm. reddish-brown solid was obtained and 1235 ml. of liquid which was found to contain the equivalent of 6.73 gm. of the mixed pentoxides, i.e. 18% of the niobium and tantalum content of the columbite originally present in the autoclave.

*Experiment 6*

Experiment No. 1 was repeated with the difference that nitrogen was introduced into the autoclave instead of air prior to heating, but no attempt was made to eliminate air originally in the autoclave or in solution in the leaching solution. Also the leaching solution contained 245 gm. KOH.

The autoclave contents after cooling were 46.88 gm. solid and 1070 ml. liquid (including washing water). After a few days, this liquid deposited 3.86 gm. of a solid found to contain 59% of niobium and tantalum pentoxides whilst the liquid was found to contain the equivalent of 4.47 gm. of the mixed pentoxides per litre. Thus the originally discharged leaching solution contained the equivalent of 7.08 gm. of the mixed pentoxides, i.e. 19% of the niobium and tantalum content of the columbite originally present in the autoclave.

*Experiment 7*

Experiment No. 2 was repeated using nitrogen at an initial pressure of 600 lbs./square inch and the 24.5% KOH leaching solution of Experiment No. 6. After 2 hours holding at 280° C., the autoclave was cooled and its contents discharged, washed out and filtered as before. This yielded 49.64 gm. of solid and 1142 ml. of a liquid which after a few days deposited 3.68 gm. of solid containing 65% mixed niobium and tantalum pentoxides. The remaining liquid was found to contain the equivalent of 2.60 gm. of the mixed pentoxides per litre. Thus the originally discharged leaching solution contained the equivalent of 5.36 gm. of the mixed pentoxides, i.e. 14.4% of the niobium and tantalum content of the columbite originally present in the autoclave.

*Experiment 8*

Experiment No. 3 was repeated using nitrogen at an initial pressure of 635 lbs./square inch and the 24.5% KOH leaching solution of Experiment No. 6.

The contents of the autoclave yielded 40.41 gm. of solid and 1225 ml. of a liquid which deposited 5.87 gm. of solid after a few days. The deposited solid contained 55% of the mixed pentoxides whilst the remaining liquid contained the equivalent of 2.8 gm. of the mixed pentoxides per litre.

Thus the originally discharged leaching solution contained the equivalent of 6.66 gm. of the mixed pentoxides, i.e. 17.8% of the niobium and tantalum content of the columbite originally present in the autoclave.

*Experiment 9*

This was intended as a repetition of Experiment No. 4 using nitrogen at an initial pressure of 700 lbs./square inch and the 24.5% KOH leaching solution of Experiment No. 6. However, inadvertently compressed air was initially introduced into the autoclave and brought to a pressure of 700 lbs./square inch before it was realized that nitrogen should have been introduced instead of air. The inadvertently introduced air was then slowly vented from the autoclave, whereafter nitrogen was introduced and brought to a pressure of 700 lbs./square inch. Accordingly, in this experiment, the leaching solution was saturated with air before the nitrogen was introduced into the autoclave.

The contents of the autoclave, after holding at 200° C. for 2 hours and cooling, yielded 41.28 gm. of solid and 1115 ml. of a liquid which deposited 10.83 gm. of a solid containing 61% of the mixed pentoxides whilst the remaining liquid contained the equivalent of 12.00 gm. of the mixed pentoxides per litre. Accordingly, the originally discharged leaching solution contained the equivalent of 19.99 gm. of the mixed pentoxides, i.e. 53% of the niobium and tantalum content of the columbite originally present in the autoclave.

*Experiment 10*

Experiment No. 5 was repeated, using nitrogen at an initial pressure of 785 lbs./square inch and the 24.5% KOH leaching solution of Experiment No. 6.

The autoclave contents yielded 44.97 gm. of solid and 1198 ml. of a liquid which deposited 6.19 gm. of a solid containing 62% of the mixed pentoxides whilst the remaining liquid contained the equivalent of 1.10 gm. of the mixed pentoxides per litre. Thus the originally discharged leaching solution contained the equivalent of 5.15 gm. of the mixed pentoxides, i.e. 13.8% of the niobium and tantalum content of the columbite originally present in the autoclave.

The above-described experiments illustrate the differences between the reaction products of leachings performed on the one hand with air in the autoclave and on the other hand with nitrogen in the autoclave. With air, even at a holding temperature as low as 150° C., 18% of the niobium and tantalum content of the columbite appears in the leaching solution, whereas only 19% of such content could be found in the leaching solution after leaching under nitrogen at 300° C. Experiment No. 9 shows that mere saturation of the leaching solution with air prior to leaching under nitrogen at 300° C. sufficiently oxygenates the reaction mixture to cause 53% of the niobium and tantalum content of the columbite to appear in the leaching solution.

We have shown that if steps are taken to exclude oxygen from the reaction mixture, little of the niobium and tantalum content of columbite would appear in the leaching solution.

Thus in two experiments in which 50 gm. of columbite was leached for four hours at 220° C. with a 20% KOH solution, the equivalent of 2.25 gm. niobium and tantalum pentoxides was present in the discharged solution when, in one of the experiments, nitrogen was initially introduced into the autoclave up to a pressure of 400 lbs./square inch, whilst the equivalent of 24.7 gm. of the pentoxides was present in the discharged solution of the other experiment in which air was initially introduced into the autoclave up to a pressure of 100 lbs./square inch.

*Experiment 11*

5 gm. of the columbite sample used in the previous experiments was charged into the autoclave with 1 litre of 24.4% KOH solution. Air was introduced into the autoclave up to a pressure of 600 lbs./square inch and thereafter the autoclave was heated to 280° C. and held at that temperature for 2 hours. After cooling, the contents were discharged, filtered and washed as described above.

The discharged contents yielded 1.15 gm. of reddish-brown solid and 1000 ml. liquid which after a few days deposited 4.87 gm. of a solid containing 46% of the mixed pentoxides of niobium and tantalum, whilst the remaining liquid contained the equivalent of 1.28 gm. of these pentoxides per litre. Accordingly the originally discharged leaching solution contained the equivalent of 3.52 gm. of the mixed pentoxides, i.e. 94.3% of the niobium and tantalum content of the columbite originally present in the autoclave.

*Experiment 12*

Experiment No. 11 was repeated, using 10 gm. of the columbite sample.

The discharged contents of the autoclave yielded 2.58 gm. of reddish-brown solid and 1055 ml. of a liquid which after a few days deposited 8.07 gm. of a solid containing 60% of the mixed pentoxides, whilst the remaining liquid contained the equivalent of 2.11 gm. of the mixed pentoxides per litre. Accordingly, the originally discharged leaching solution contained the equivalent of 7.06 gm. of the mixed pentoxides, i.e. 94.5% of the niobium and tantalum content of the columbite originally present in the autoclave.

Experiment 13

Experiment No. 11 was again repeated, this time using 25 gm. of the columbite sample.

The discharged contents yielded 8.70 gm. of reddish-brown solid and 1080 ml. of liquid.

In this case the liquid very rapidly began to deposit solid and had deposited 22.07 gm. of solid within a few hours. This solid contained 60% of the mixed pentoxides, whilst the remaining liquid contained the equivalent of 2.19 gm. of the mixed pentoxides per litre.

Accordingly, the originally discharged leaching solution contained the equivalent of 15.54 gm. of the mixed pentoxides, i.e. 83.3% of the niobium and tantalum content of the columbite originally present in the autoclave.

Experiment 14

Experiment No. 11 was again repeated, this time with 100 gm. of the columbite sample.

The discharged contents yielded 60.49 gm. of reddish-brown solid and 1110 ml. of a liquid which after a few days deposited 6.77 gm. of a solid containing 41.5% of the mixed pentoxides, whilst the remaining liquid contained the equivalent of 45.21 gm. of the mixed oxides per litre.

Accordingly, the originally discharged leaching solution contained the equivalent of 52.93 gm. of the mixed pentoxides, i.e. 70.9% of the niobium and tantalum content of the columbite originally present in the autoclave.

Experiment 15

Experiment No. 11 was again repeated, this time with 200 gm. of the columbite sample.

The discharged contents yielded 107.38 gm. of reddish-brown solid and 1025 ml. of a liquid which after a few days deposited 12.94 gm. of a solid containing 40.5% of the mixed pentoxides, whilst the remaining liquid contained the equivalent of 107.4 gm. of the mixed pentoxides per litre.

Accordingly, the originally discharged leaching solution contained the equivalent of 115.39 gm. of the mixed pentoxides, i.e. 77.2% of the niobium and tantalum content of the columbite originally present in the autoclave.

Experiment 16

Experiment No. 11 was repeated, using 1 kilogram of the columbite sample, a 30.5% KOH solution and an initial air pressure of 750 lbs./square inch. On opening the autoclave it was found to contain a thick sludge which was removed and filtered and thereafter washed four times with de-ionised water. Prior to washing, the liquid obtained had a volume of 945 ml. and contained the equivalent of 205.6 gm. of the mixed pentoxides per litre. The first wash water had a volume of 1295 ml. and contained the equivalent of 54.1 gm. of the mixed pentoxides, the second wash water had a volume of 1185 ml. and contained the equivalent of 31.0 gm. of the mixed pentoxides, whilst the third wash water had a volume of 2730 ml. and contained the equivalent of 54.1 gm. of the mixed pentoxides. The fourth wash water had a volume of about 1200 ml. and was not analysed.

Thus whilst at room temperature the originally discharged leaching solution contained the equivalent of 194.2 gm. of the mixed pentoxides, the solid residue contained at least the equivalent of 139.2 gm. of the mixed pentoxides as soluble compounds, so that at least the equivalent of 333.4 gm. of the mixed pentoxides must have been dissolved in the leaching solution at the holding temperature of 280° C. Thus the leaching operation solubilized at least 44.6% of the niobium and tantalum content of the columbite originally present in the autoclave.

Experiment 17

50 gm. of the columbite sample used in the previous experiments was charged into the autoclave with a 41% KOH solution and air introduced up to a pressure of 600 lbs./square inch. The autoclave was then heated to 280° C., held at that temperature for 2 hours and cooled. The contents were discharged, filtered and washed as in Experiments Nos. 1 to 15.

The discharged contents yielded 66.06 gm. of reddish-brown solid and 1200 ml. of liquid. Acidification with hydrochloric acid and boiling caused no apparent precipitation from such liquid, indicating the absence of niobium or tantalum compounds in the discharged leaching solution.

Experiment 18

Experiment No. 17 was repeated with the use of a 10.3% KOH solution in place of the 41% solution used in Experiment No. 17.

The discharged contents of the autoclave yielded 34.60 gm. of solid and 875 ml. of liquid which deposited 1.56 gm. of a solid containing 0.94 gm. of mixed pentoxides, whilst the remaining liquid contained the equivalent of 16.02 gm. of the mixed pentoxides per litre. The discharged leaching solution therefore contained the equivalent of 14.96 gm. of the mixed pentoxides, i.e. 40.05% of the niobium and tantalum content of the columbite originally present in the autoclave.

Experiment 19

Experiment No. 17 was again repeated, this time using a 4.9% KOH solution.

The discharged contents of the autoclave yielded 44.65 gm. of solid and 950 ml. of a liquid which deposited 0.48 gm. of a solid containing 0.29 gm. of the mixed pentoxides, whilst the remaining liquid contained the equivalent of 1.31 gm. of the mixed pentoxides per litre. Accordingly, the discharged leaching solution contained the equivalent of 1.54 gm. of the mixed pentoxides, i.e. 4.12% of the niobium and tantalum content of the columbite originally present in the autoclave.

Experiment 20

Experiment No. 17 was again repeated, this time using a 1.2% KOH solution.

The discharged contents of the autoclave yielded 47.08 gm. of solid and 915 ml. of a liquid which was found to contain the equivalent of 0.077 gm. of the mixed pentoxides, i.e. 0.21% of the niobium and tantalum content of the columbite originally present in the autoclave.

These Experiments Nos. 17 to 20 show the effect of changing concentration in the leaching solution. It will be noted that with the most concentrated (41%) leaching solution, no soluble niobium and tantalum compounds were detected in the leaching solution, indicating that at the higher concentrations (at this particular temperature, 280°), any decomposition of the mineral results in the formation of insoluble compounds, probably potassium metaniobate and potassium metatantalate.

Experiment 21

50 gm. of a sample of columbite containing the equivalent of 75% of mixed niobium and tantalum pentoxides was charged into the autoclave with 1 litre of a 26% KOH solution. Air was introduced into the autoclave until a pressure of 600 lbs./square inch was attained, whereupon the autoclave was heated to 280° C. and held at that temperature for 30 minutes. After cooling, the autoclave contents were discharged, filtered and washed to yield 28.09 gm. of solid and a liquid containing the equivalent of 18.83 gm. of the mixed pentoxides per litre.

Experiment 22

Experiment No. 21 was repeated with the exception that the temperature of 280° C. was held for 1 hour. The discharged contents of the autoclave yielded 19.43 gm. of solid and a liquid containing the equivalent of 27.69 gm. of the mixed pentoxides per litre.

Experiment 23

Experiment No. 21 was again repeated, this time with a holding period at 280° C. of 4 hours. The discharged contents of the autoclave yielded 18.61 gm. solid and a liquid containing the equivalent of 23.75 gm. of the mixed pentoxides per litre.

Experiment 24

100 gm. of columbite ground to pass a 200 mesh sieve was leached for three hours at 240° C. with 1 litre of 30% KOH, air being initially introduced into the autoclave until a pressure of 400 lbs./square inch was attained. After cooling, the autoclave contents were discharged and yielded 70.2 gm. of solid and a liquid that contained the equivalent of 41.2 gm. of the mixed pentoxides per litre.

In this experiment, as noted above, the columbite contained niobium and tantalum pentoxides in the approximate weight ratio of 8.2:1.

Experiment 25

Experiment 24 was repeated but with the use of 100 gm. of a sample of tantalite ground to pass a 200 mesh sieve. The autoclave contents yielded 108.2 gm. of solid and a liquid that contained the equivalent of 5.7 gm. of the mixed pentoxides per litre.

In this experiment the tantalite contained, as noted above, niobium and tantalum pentoxides in the approximate weight ratio of 1:4.0 and which may be referred to as a tantalo-columbite. Comparison of the results of the last two experiments shows that the ease of decomposition of the mineral depends on the Nb/Ta ratio of the mineral. Other experiments have verified this fact.

The experiments show that columbite may be decomposed by aqueous potassium hydroxide solutions under conditions that may be used for large-scale operations, either in autoclaves as a batch process or in suitable continuous or semi-continuous flow reactors.

The experiments described above show that when atmospheric oxygen is in contact with the reaction mixture the reaction proceeds to give soluble niobium and/or tantalum compounds. When suitable conditions of temperature and caustic potash concentration are chosen the reaction proceeds substantially to completion in a short time and is only negligibly accelerated by the presence of oxidising agents and/or oxygen carriers in the reaction mixture. However, under conditions in which the reaction proceeds more slowly, e.g. low temperature and/or low caustic potash concentration and/or restricted atmospheric oxygen, the presence of an oxidising agent and/or of an oxygen carrier materially accelerates the reaction or permits it to proceed to soluble products.

In carrying out the process of the invention, conditions that are unfavourable for the formation of insoluble compounds of niobium and/or tantalum should be chosen. In general, such compounds result from the use of high temperatures and highly-concentrated caustic potash solutions with an extended treatment period. At temperatures below about 240° C. such compounds are rarely formed to any measurable extent even with solutions of about 35% caustic potash, whereas such compounds are eventually formed at 300° C. with solutions of about 20% caustic potash.

Accordingly, convenient operating conditions for practical operation of the process would appear to involve the use of caustic potash solutions having a concentration in the range of about 18–30% by weight with operating temperatures in the range of about 210°–250° C., simultaneous use of the highest temperatures and solution concentrations preferably being avoided if, for other reasons, an extended treatment period is to be used. In practical processes air would probably be the most convenient oxidising agent to employ.

The term "oxidizing agent" as employed in the appended claims shall be understood to include oxygen, air and oxygen carriers, as well as compounds of the type identified earlier herein as oxidizing agents, including those containing the element oxygen.

We claim:

1. A process for decomposing a mineral selected from the group consisting of columbites and tantalo-columbites having a weight ratio of niobium to tantalum of at least about 1:4, which comprises leaching said mineral in finely divided form with an aqueous caustic potash solution containing between about 5 and about 50% by weight KOH in the presence of an added oxidizing agent in contact with the mineral and the leaching solution at a temperature between about 300 and 100° C. while maintaining liquid leaching solution in contact with said mineral to thereby solubilize niobium and tantalum values.

2. A process as set forth in claim 1 wherein the caustic potash leaching solution contains between about 18 and 30% by weight KOH and leaching is carried out at between about 300 and 150° C.

3. A process for decomposing a mineral selected from the group consisting of columbites and tantalo-columbites having a weight ratio of niobium to tantalum of at least about 1:4, which comprises leaching said mineral in finely divided form with an aqueous caustic potash solution containing between about 5 and about 40% by weight KOH in the presence of added oxygen in contact with the mineral and the leaching solution at a temperature between about 300 and 100° C., under pressure sufficient to maintain liquid leaching solution in contact with said mineral to thereby solubilize niobium and tantalum values.

4. A process for decomposing a mineral selected from the group consisting of columbites and tantalo-columbites having a weight ratio of niobium to tantalum of at least 1:4, which comprises leaching said mineral in finely divided form with an aqueous caustic potash solution containing about 18 to 30% by weight KOH in the presence of added air in contact with the mineral and the leaching solution at between about 300 and 150° C. and under pressure sufficient to maintain liquid leaching solution in contact with said mineral to thereby solubilize niobium and tantalum values.

5. A process for decomposing a mineral selected from the group consisting of columbites and tantalo-columbites having a weight ratio of niobium to tantalum of at least 1:4 to solubilize niobium and tantalum values thereof, which comprises leaching said mineral in finely divided form with an aqueous solution containing about 18 to 35% by weight caustic potash in the presence of an added oxidizing agent in contact with the mineral and the leaching solution at a temperature between about 210 and 250° C., while maintaining liquid leaching solution in contact with said mineral.

6. A process as set forth in claim 5 wherein the added oxidizing agent is oxygen.

References Cited in the file of this patent

UNITED STATES PATENTS

| 664,488 | Miller | Dec. 25, 1900 |
| 2,086,570 | Meyer | July 13, 1937 |
| 2,187,750 | Maruim | Jan. 23, 1940 |
| 2,773,737 | Nielsen et al. | Dec. 11, 1956 |
| 2,819,945 | Ruhoff et al. | Jan. 14, 1958 |
| 2,974,014 | Hoekje et al. | Mar. 7, 1961 |

FOREIGN PATENTS

| 805,501 | Great Britain | Dec. 10, 1958 |

OTHER REFERENCES

Mellor, J. W.: "A Comprehensive Treatise on Inorganic and Theoretical Chemistry," vol. 9, Longmans Green and Co., New York, 1929, pages 842–843.

Dickson et al. in "Extraction and Refining of the Rarer Metals," a symposium of The Institution of Mining and Metallurgy, London, 1957, Paper No. 14, pages 258–271 (pages 264, 266 and 263 of particular interest).